(12) United States Patent
Naruse

(10) Patent No.: US 9,753,535 B2
(45) Date of Patent: Sep. 5, 2017

(54) VISUAL LINE INPUT APPARATUS

(71) Applicant: DENSO CORPORATION, Kariya, Aichi-pref. (JP)

(72) Inventor: Youichi Naruse, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/888,479

(22) PCT Filed: May 8, 2014

(86) PCT No.: PCT/JP2014/002442
§ 371 (c)(1),
(2) Date: Nov. 2, 2015

(87) PCT Pub. No.: WO2014/181543
PCT Pub. Date: Nov. 13, 2014

(65) Prior Publication Data
US 2016/0170485 A1 Jun. 16, 2016

(30) Foreign Application Priority Data
May 9, 2013 (JP) .................................. 2013-099662

(51) Int. Cl.
*G06F 3/01* (2006.01)
*B60K 35/00* (2006.01)
(Continued)

(52) U.S. Cl.
CPC .............. *G06F 3/013* (2013.01); *B60K 35/00* (2013.01); *B60K 37/06* (2013.01); *G02B 27/01* (2013.01);
(Continued)

(58) Field of Classification Search
None
See application file for complete search history.

(56) References Cited

U.S. PATENT DOCUMENTS

| 4,908,611 A * | 3/1990 | Iino .......................... B60Q 3/04 |
| | | 340/980 |
| 6,677,969 B1 | 1/2004 | Hongo |
| (Continued) | | |

FOREIGN PATENT DOCUMENTS

| JP | H09167049 A | 6/1997 |
| JP | H11-184621 A | 7/1999 |
| (Continued) | | |

OTHER PUBLICATIONS

International Search Report and Written Opinion (in Japanese with English Translation) for PCT/JP2014/002442, mailed Aug. 5, 2014; ISA/JP.

*Primary Examiner* — Nicholas Lee
(74) *Attorney, Agent, or Firm* — Harness, Dickey & Pierce, P.L.C.

(57) ABSTRACT

A visual line input apparatus selects an input element objected to be inputted by a visual line, and includes a head-up display device and a visual line detector. The head-up display device displays a plurality of input image elements in front of a windshield and a display region virtually arranged in front of a driving seat in a vehicle. The visual line detector is arranged in front of the driving seat and detects a gazing point made by a driver who sits on the driving seat. The head-up display device displays the plurality of input element images on the display region, and does not display the outer part of the input element image displayed at an end portion of the display region.

6 Claims, 4 Drawing Sheets

(51) Int. Cl.
*G02B 27/01* (2006.01)
*B60K 37/06* (2006.01)

(52) U.S. Cl.
CPC ..... *G02B 27/0101* (2013.01); *G02B 27/0179* (2013.01); *B60K 2350/1052* (2013.01); *G02B 2027/0141* (2013.01); *G02B 2027/0187* (2013.01)

(56) References Cited

U.S. PATENT DOCUMENTS

| | | |
|---|---|---|
| 6,983,424 B1 | 1/2006 | Dutta |
| 2005/0235226 A1 | 10/2005 | Watanabe et al. |
| 2007/0057781 A1* | 3/2007 | Breed .................. B60K 35/00 340/457.1 |
| 2010/0238280 A1 | 9/2010 | Ishii |
| 2010/0283730 A1* | 11/2010 | Miyazaki ............... G06F 3/017 345/158 |

FOREIGN PATENT DOCUMENTS

| | | |
|---|---|---|
| JP | H11-237942 A | 8/1999 |
| JP | 2000163196 A | 6/2000 |
| JP | 2002055807 A | 2/2002 |
| JP | 2005138755 A | 6/2005 |
| JP | 2005165491 A | 6/2005 |
| JP | 2006219000 A | 8/2006 |
| JP | 2007-237919 A | 9/2007 |
| JP | 2010215194 A | 9/2010 |
| JP | 2011164955 A | 8/2011 |
| JP | 2012056359 A | 3/2012 |

* cited by examiner

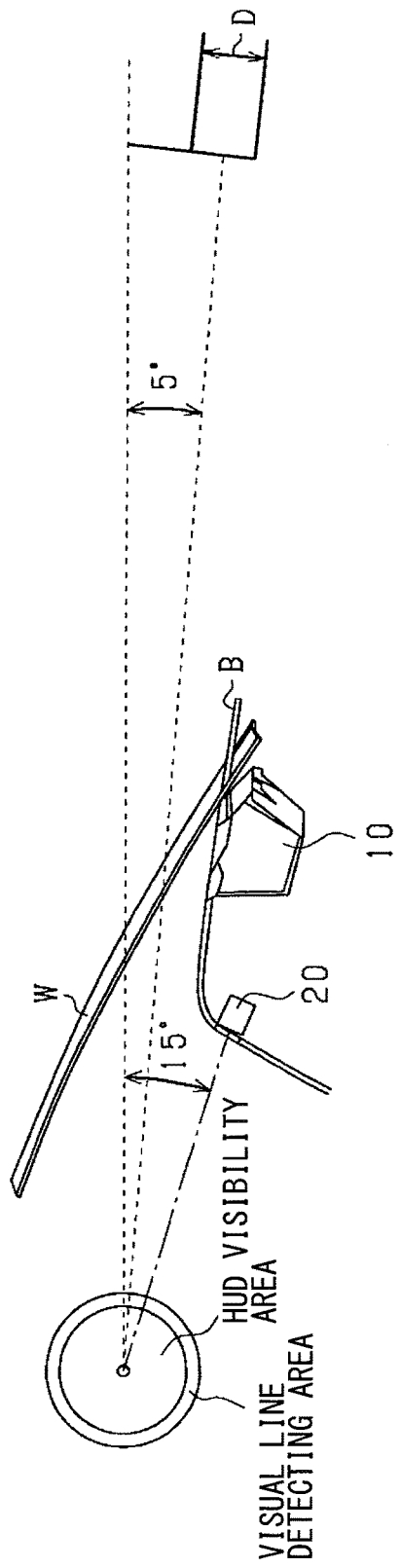

VISUAL LINE INPUT APPARATUS

CROSS REFERENCE TO RELATED APPLICATIONS

This application is a U.S. National Phase Application under 35 U.S.C. 371 of International Application No. PCT/JP2014/002442 filed on May 8, 2014 and published in Japanese as WO 2014/181543 A1 on Nov. 13, 2014. This application is based on and claims the benefit of priority from Japanese Patent Application No. 2013-099662 filed on May 9, 2013. The entire disclosures of all of the above applications are incorporated herein by reference.

TECHNICAL FIELD

The present disclosure relates to a visual line input apparatus that selects an input element through a visual line.

BACKGROUND ART

Visual line input apparatuses have been proposed as an interface between an apparatus, such as a vehicular apparatus and a mobile terminal, and a human. For example, Patent Literature 1 discloses that a visual line detector is arranged at the bottom side of a navigation device arranged at the center of an instrument panel in a vehicle; the user's gazing position at a display screen of the navigation device is detected by the visual line detector; and a visual line input to the navigation device is carried out.

PRIOR ART LITERATURES

Patent Literature

Patent Literature 1: JP-H9-167049-A

SUMMARY OF INVENTION

As disclosed in Patent Literature 1, when the visual line detector and the display screen are arranged at the center of the instrument panel, the visual line is detected from a side of a driver's face. When the visual line is detected from the side of the driver's face, the detection accuracy gets lower in comparison to the case where the visual line is detected from the front side of the driver's face. It is difficult to arrange a visual line detector and a display screen in front of the driver in some vehicle compartments.

In view of the above situations, it is an object of the present disclosure to provide a visual line input apparatus that detects a gazing point in a higher accuracy by properly arranging a visual line detector and a display screen.

A visual line input apparatus according to an aspect of the present disclosure selects an input element objected to be inputted through a visual line, and includes: a head-up display device that displays a plurality of input element images on a display region arranged in front of a front window and in front of driving seat in a vehicle; and a visual line detector that is arranged in front of the driving seat and detects a gazing point made by a driver who sits on the driving seat. The head-up display device displays the plurality of input element images on the display region, and does not display an outer part of the input element image displayed at an end portion of the display region.

According to the embodiment, the head-up display device displays the input element images on the display region arranged in front of the driving seat in the vehicle. Then, the visual line detector arranged in front of the driving seat detects the gazing point made by the driver who is looking at the image displayed on the display region.

With the use of the head-up display device, the visual line detector and the display region may be arranged in front of the driver in the limited space in the vehicle. With regard to the image displayed by the head-up display device, since the side visibility angle is narrow, when the driver looks at the display region from the front side, then the driver's head is substantially fixed to the front. Accordingly, the driver's gazing point can be normally detected from the front side. Therefore, with the combination of the head-up display device and the visual line detector, the driver's gazing point can be detected in a higher accuracy by properly arranging the visual line detector and the display region.

The head-up display device arranges the input element images in a row and displays the images on the display region, and does not display the outer part of the image of the input element displayed at the end of the row. Accordingly, it appears that the input element images are provided continuously outside the display region. In other words, the driver can recognize that there are input element images not being displayed outside the display region.

BRIEF DESCRIPTION OF DRAWINGS

The above and other objects, features and advantages of the present disclosure will become more apparent from the following detailed description made with reference to the accompanying drawings. In the drawings:

FIG. 2A is a diagram that shows arrangement locations for a visual line detector and a HUD device;

EMBODIMENTS FOR CARRYING OUT INVENTION

Figure 1:
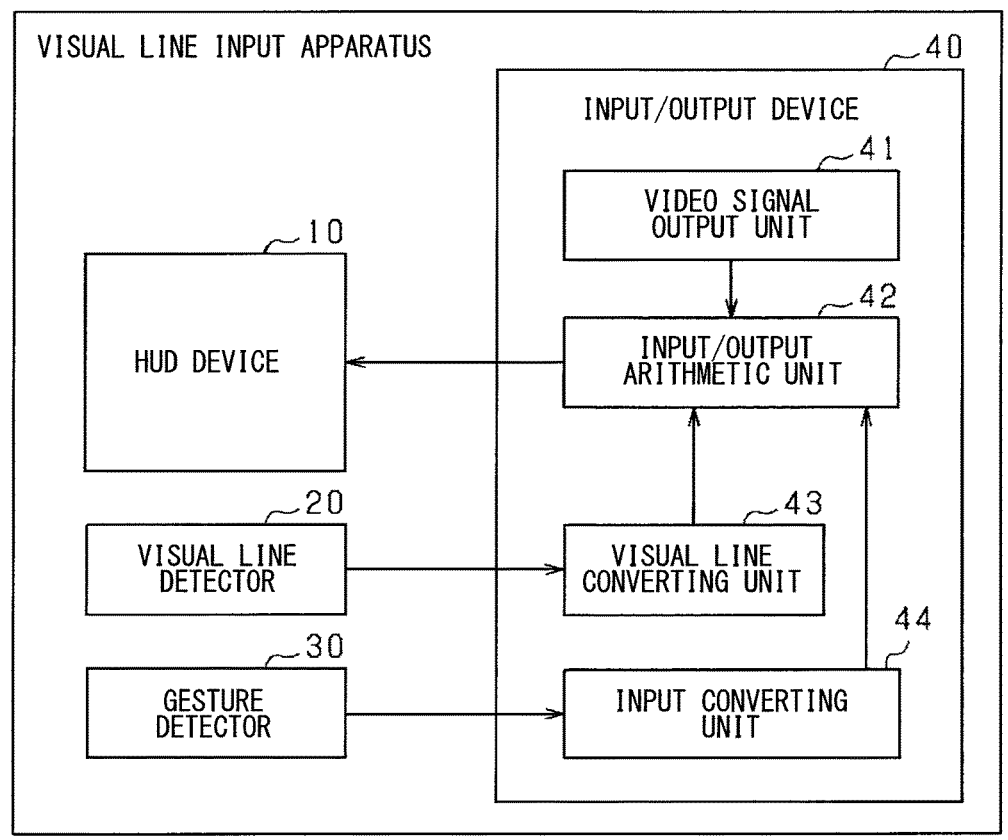
FIG. 1 is a block diagram that shows the configuration of a visual line input apparatus.

The following describes an embodiment in which a visual line input apparatus is mounted to a vehicle. As shown in FIG. 1, the visual line input apparatus according to the present embodiment includes a HUD device 10 (i.e., a head-up display device), a visual line detector 20, a gesture detector 30 and an input/output device 40. With regard to the visual line input apparatus, an input element displayed in a display region of the HUD device 10 is selected, and an input of the input element selected based on the detection of a gesture is confirmed.

Figure 2B:
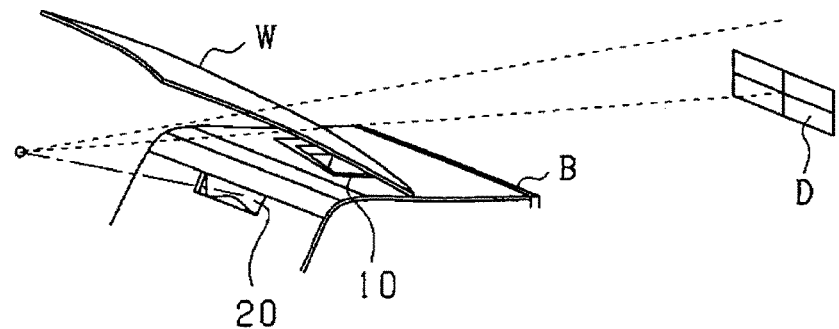
FIG. 2B is a diagram that shows arrangement locations for the visual line detector and the HUD device.

As shown in FIGS. 2A and 2B, the HUD device 10 is buried at the rear side of a dashboard B under a windshield W. The HUD device 10 is a display device that displays a video image, which is outputted from the input/output device 40, with an image of the input element on a virtual display region D set at the front side of the windshield W and the front side of a driver's seat. The HUD device 10 controls the image displayed on a liquid crystal panel from the rear side of the dashboard B to reflect on a mirror, and further controls the image to be reflected on a concave mirror and to be enlarged, and then controls the enlarged image to be reflected on the windshield W. Therefore, the driver can see the image displayed that seems to float on the virtual display region D set in front of the windshield W. It is noted that the image of the input element is displayed on the display region D.

With regard to the image displayed on the display region D, since a side visibility angle is narrow, the driver cannot necessarily view the image displayed on the display region D from anywhere; in other words, the driver can only view the image when the eye's position is within a HUD visibility area in front of the display region D. The HUD visibility area is a circular area, and the center of the circular area corresponds to the front surface of the center of the display region D. When the driver sits on the driving seat and wants to view the image at the front side, the driver's both eyes are fixed into the HUD visibility area direct to the display region D. Since the both eyes of a passenger other than the driver are not in the HUD visibility area, the passenger other than the driver cannot view the image displayed on the display region D. Therefore, the driver can use the display region D as a private display.

FIG. 2A illustrates the circular HUD visibility area for easier understanding, the circular HUD visibility area in fact is confronting directly to the display region D.

The visual line detector 20 is arranged at the front side of the driving seat, and detects a gazing point of the driver who is sitting on the driving seat. In particular, the visual line detector 20 is a camera that is arranged at a predetermined area below the display region D, and shoots the driver's eyes irradiated by near infrared light which is invisible. To detect the driver's gazing point, it is required to arrange the visual line detector 20 within 30 degree above/below and left/right with respect to the driver's gazing point. In the present embodiment, in order to detect the driver's gazing point above the display region D, the visual line detector 20 is arranged at the dashboard B at a position of 10 degree below the display region D. In this way, the arranged visibility detection area of visual line detector 20 includes the HUD visibility area inside the visual line detecting area, and is made concentric with the HUD visibility area. Therefore, when the driver's both eyes are within the HUD visibility area, the visual line detector 20 can detect the driver's gazing point.

The gesture detector 30 is arranged at the instrument panel I below the visual line detector 20 (see FIG. 3), and detects the gesture made by the driver who is sitting on the driving seat. The gesture detector 30, for example, detects the movement of hand waving or the movement of having hand open or close.

The input/output device 40 includes a video signal output unit 41, an input/output arithmetic unit 42, a visual line converting unit 42, and an input converting unit 44. The video signal output unit 41 outputs a video signal, which is displayed on the display region D, to the input/output arithmetic unit 42. The visual line converting unit 43 detects a pupil which has been changing in position based on a visual line direction and corneal reflex which is not affected by the visual line direction, and detects the gazing point based on the positional relationship between the pupil and the corneal reflex. The visual line converting unit 43 outputs the coordinate of the detected gazing point to the input/output arithmetic unit 42. The input converting unit 44 outputs an input confirmation signal to the input/output arithmetic unit 42 when the gesture detector 30 detects the driver's gesture.

The input/output arithmetic unit 42 outputs a video signal sent from the video signal output unit 41 to the HUD device 10, and determines an input element selected by the driver based on the video signal sent from the video signal output device 41 and the coordinate of the gazing point sent from the visual line converting unit 43. Moreover, when the input/output arithmetic device 42 receives an input confirmation signal from the input converting unit 44, the input/output arithmetic device 42, confirms an input of the input element selected by the driver, and outputs a command to a device that corresponds to the input element.

Figure 3:
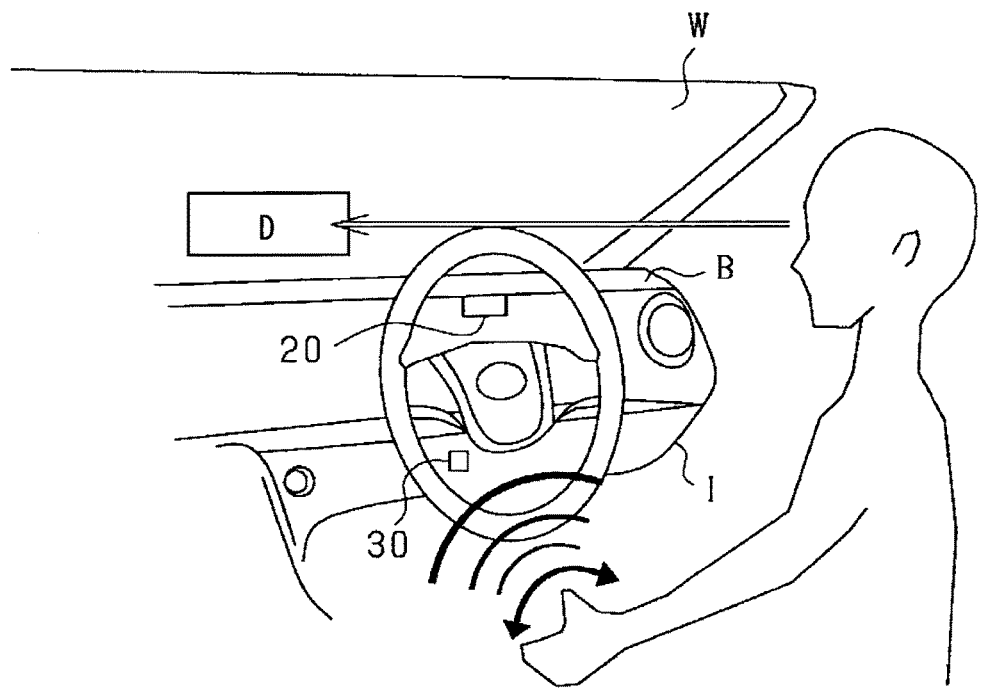
FIG. 3 is a diagram that shows a driver carries out a visual line input.

The following describes an embodiment in which the driver performs a visual line input with reference to FIG. 3. The present embodiment is configured to input an input element only when the vehicle stops for traveling safety. When the driver gazes at the input element displayed on the display region D, the visual line detector 20 detects the driver's gazing point, and the input/output arithmetic unit 42 determines which one of the input elements is gazed by the driver. In a state where an input element is selected, when the driver waves his or her hand, the input/output arithmetic unit 42 confirms the input of the input element which is gazed by the driver.

Figure 4A:
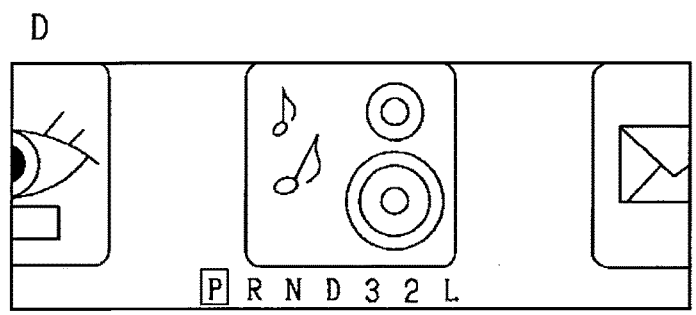
FIG. 4A is a diagram that shows an input element displayed in a display region.
Figure 4B:
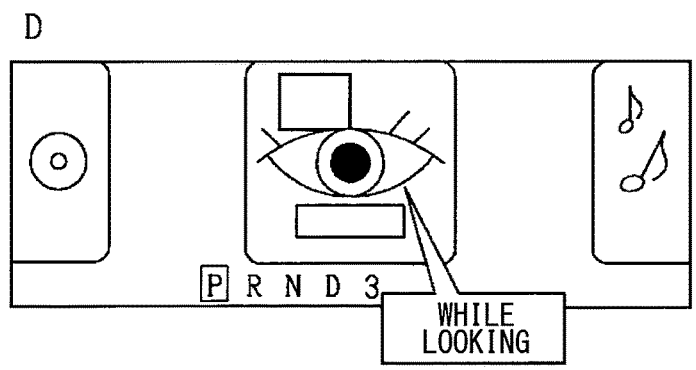
FIG. 4B is a diagram that shows a situation where an input element is confirmed.
Figure 4C:
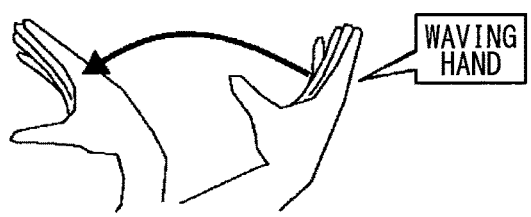
FIG. 4C is a diagram that shows a situation where an input element is confirmed.

The following describes the input element which is controlled by the HUD device 10 to be displayed at the display region D with reference to FIGS. 4A through 4C. In FIGS. 4A and 4B, the symbol of an eye illustrates the driver's gazing point, but is not actually displayed on the display region D. As illustrated in FIG. 4A, the HUD device 10 displays the images of a plurality of input elements in a row on the display region D. In the present embodiment, there are three images of input elements to be displayed. Moreover, the HUD device 10 does not display the outer part of the image of the input element displayed at both of right and left ends of the display region D. In other words, the HUD device 10 does not display the left part of the image of the input element to be displayed at the left end and the right part of the image of the input element to be displayed at the right end. In this way, there are not only three images of the input elements to be displayed on the display region D, the images are provided continuously at both left and right ends of the display region D. Additionally, the HUD device 10 displays the shift position of the speed changer of the vehicle below the center of the display region D. When the shift position displayed on the display region D is in a parking state, the driver can perform a visual line input.

With regard to FIG. 4A, the driver gazes at the image of the input element at the left end and selects the image. Herein, since the driver's gazing point is on the image different from the image of the input element located at the center of a row, the input of the image having a gazing point cannot be confirmed even if the driver makes a gesture in this situation. When the driver's gazing point is at the image different from the image if the input element located at the center of the row, the HUD device 10 displays moves the image having the driver's gazing point to the center of the row, and the image is displayed on the display region D as shown in FIG. 4B. In other words, the HUD device 10 places the image of the input element to the right one by one and displays the image on the display region D. Thus, the image of the input element displayed at the right end in FIG. 4A is not displayed in FIG. 4B, and the image of the input element, which is not displayed in FIG. 4A, is displayed at the left end in FIG. 4B. In this situation, when the driver waves his or her hand as shown in FIG. 4C while looking at the image of the input element at the center, the input of the input element having the driving's gazing point is confirmed.

The present embodiment mentioned above generates the following effects.

The HUD device 10 displays the image of the input element on the virtual display region D arranged in front of the driving seat in the vehicle, and the visual line detector 20 arranged at the front side of the driving seat detects the gazing point of the driver who is looking at the image displayed on the display region D. With the use of the HUD device 10, the visual line detector 20 and the display region D can be arranged at the front of the driver in the limited space in the vehicular compartment. With regard to the image displayed by the HUD device 10, the side visibility angle is narrow so that the driver can look at the display region D from the front side, and the driver's head is substantially fixed to the front side. The gazing point made by the driver can be detected from the front side normally. Accordingly, with the combination of the HUD device 10 and the visual line detector 20, the visual line detector 20 and the display region D are properly arranged to detect the driver's gazing point in a higher accuracy.

The image displayed by the HUD device 10 cannot be viewed by a passenger other than the driver since the side visibility angle is narrow. Thus, the driver can perform an input operation without being annoyed by the passenger, and can see the personal information displayed on the display region D without caring the passenger's eyes.

When the visual line detector 20 is arranged at a predetermined region at the bottom side of the display region D, the gazing point made by the driver who is looking at the display region D is within the detection area of the visual line detector 20. Accordingly, the gazing point of the driver who is looking at the display region D can be surely detected.

The images of the input elements are made into a row and displayed on the display region D, and the outer part of the image of the input element displayed at the end of the row is not displayed. Therefore, it appears that the images of the input element outside the display region D are provided continuously. In other words, the driver can recognize that the image of the input element, which is not displayed on the display region D, is present.

When the driver makes a gesture in a situation where the input element is selected by a visual line, the input of the selected input element can be confirmed. Accordingly, the image of the input element is displayed on the virtual display region D, and the input of the input element can be confirmed without touching, for example, a touch panel or a button.

When the image of the input element selected by a visual line is not at the center, the image of the selected input element is moved to the center. When the driver gazes at the image of the input element while making a gesture after the image of the input element has been moving, the input of the input element can be confirmed.

When the visual input is only accepted during vehicle stop, an erroneous operation caused by an erroneous input during travel is inhibited so that the travel safety can be ensured.

The driver can recognize whether the visual line input is accepted when the shift lever position of the vehicle is displayed on the display region D.

(Modification)

The present disclosure is not restricted to the description content of the above embodiment.

The image of the input element having a gazing point made by a driver may be highlighted. In this way, the driver can recognize which input element is selected.

The on/off state of a parking brake may be also displayed in the display region. In this way, the driver can recognize the situation in which the visual line input is accepted.

The images of the input elements may be displayed in a row or a column on the display region D. In this situation, the outer part of the image of the input element displayed at the upper and lower ends is not displayed.

It also may be configured that there are more than three images of input elements displayed on the display region D. In addition, the number of images of input elements displayed on the display region D may be an even number. In this situation, when the driver gazes at the image placed at the center biased to the right or at the center biased to the left on the display region D, the input of the input element is confirmed as the driver makes a gesture.

The visual line input may also be enabled other than at the time of vehicle stop under certain conditions.

In a case of confirming the input to the input element, the method other than making a gesture may also be possible. For example, the input element may also be confirmed by blinking or speech. Alternatively, the input of the input element may also be confirmed by gazing at the image of the input element longer than a predetermined time interval. Moreover, a switch may be provided to a handle so that the input of the input element may be confirmed by selecting the input element by a visual line and pressing the switch. Furthermore, the input of the input element may also be confirmed by making a gesture other than hand waving.

What is claimed is:

1. A visual line input apparatus for selecting an input element objected to be inputted by a visual line, comprising:
    a head-up display device that displays a plurality of input element images on a display region virtually arranged in front of a windshield and in front of a driving seat in a vehicle;
    a visual line detector that is arranged in front of the driving seat, and detects a gazing point made by a driver who sits on the driving seat; and
    a gesture detector that detects a gesture made by the driver,
    wherein the head-up display device displays the plurality of input element images in a row, and does not display an outer part of the input element images displayed at an end portion of the display region, and
    wherein when the visual line detector detects the gazing point on one of the input element images at a center of the row, an input to the one of the input element images at the center is confirmed in a case where the gesture detector detects the gesture made by the driver.

2. The visual line input apparatus according to claim 1, wherein the visual line detector is arranged at a predetermined region below the display region.

3. The visual line input apparatus according to claim 1, wherein when the gazing point detected by the visual line detector is on an other input element image different from the one of the input element images at the center of the row, the head-up display device moves the other input element image having the gazing point to the center of the row.

4. The visual line input apparatus according to claim 1, wherein an input to the one of the input element images is accepted when the vehicle stops.

5. The visual line input apparatus according to claim 1, wherein the head-up display device displays a shift lever position of the vehicle in the display region.

6. The visual line input apparatus according to claim 1, wherein the head-up display device displays an on and off state of a parking brake.

* * * * *